United States Patent

[11] 3,632,114

[72] Inventor Itsuki Ban
829 Higashi-Oizumimachi, Nerima-ku, Tokyo-to, Japan

[21] Appl. No. 865,554
[22] Filed Oct. 13, 1969
[45] Patented Jan. 4, 1972
[32] Priority Oct. 14, 1968
[33] Japan
[31] 43/74164

[54] TRACK-SELECTING APPARATUS
6 Claims, 4 Drawing Figs.

[52] U.S. Cl. .... 274/4 A
[51] Int. Cl. .... G11b 21/08
[50] Field of Search .... 318/602, 673; 274/4 A, 11; 317/123, 157; 179/100.2 CA, 100.2 Z

[56] References Cited

UNITED STATES PATENTS

| | | | |
|---|---|---|---|
| 2,888,624 | 5/1959 | Stover | 318/602 |
| 3,001,118 | 9/1961 | Goetz | 318/602 |
| 3,243,676 | 3/1966 | Willmann | 318/673 |
| 3,450,409 | 6/1969 | Pitzer | 274/4 A |
| 3,493,830 | 2/1970 | Sebastian | 318/602 |
| 3,532,833 | 10/1970 | Suzuki | 179/100.2 CA |

*Primary Examiner*—Harry N. Haroian
*Attorney*—Jacobs & Jacobs

ABSTRACT: A track-selecting apparatus for a multitrack magnetic tape player, wherein a plurality of track-selecting switches are provided corresponding to individual tracks on the tape. At least one rotary switch means is rotated synchronizing with a rotary cam actuable so as to allow a magnetic head to synchronize with the tracks thereby scanning across the tape. Rotation of the rotary cam is controlled by the track-selecting switches and the rotary switch, and the magnetic head being automatically moved to a position suitable for the track designated by the track-selecting switch.

INVENTOR

BY

ATTORNEY

INVENTOR

BY

ATTORNEY

TRACK-SELECTING APPARATUS

BACKGROUND OF THE INVENTION

The present invention relates to a track-selecting apparatus for a multitrack tape player and more particularly to such apparatus for designating a track to be played on the tape and automatically shifting a magnetic head into the designated track position. Conventionally, the tape player for the tape cartridge which is provided with a multitrack or multichannel magnetic tape in endless array, includes a track-changing device. One of the general types of the track-changing device comprises a rotary cam actuatable so as to allow a magnetic head to synchronize with the tracks thereby scanning across the tape, a solenoid for intermittently and rotatably driving the cam whenever energized, and a control circuit for the solenoid including a contactor consisting of two feeler contacts shorted by a conductive patch on the tape, the solenoid being operated in response to the passage of the conductive patch through the contactor to successively shift the magnetic head to a position where it is suitable for each tracks on the tape. According to the track changing device aforementioned, the second track could not be played without completion of the play of the first track in case of four tracks. To this end, the pushbutton switch is provided in parallel to the contactor and the latter is operated to energize the solenoid thus moving the magnetic head to the second track even in the course of the first track being played. However, in order to play the fourth track as the first has played, the pushbutton switch is required to be operated at three times as a whole. The number of operation times for the pushbutton switch is three at its maximum if the number of tracks is four. On the other hand, eight tracks require operation of the pushbutton switch at seven times at its maximum thereby causing much trouble.

SUMMARY OF THE INVENTION

It is a principal object of the present invention to provide a track-selecting apparatus for a multitrack magnetic tape player, designating a track to be played and automatically selecting the designated track for its play.

Another object of the invention is to provide a track selecting apparatus for a multitrack magnetic tape player, wherein rotation of a rotary cam for shifting a magnetic head to a position suitable for each track is controlled by at least one rotary switch rotatable synchronizing with the rotary cam and by track selecting switches provided corresponding to the individual track on the tape, with operation of the track-selecting switch the magnetic head is shifted at a breath to the designated track position.

A further object of the invention is to provide a track selecting apparatus for a multitrack magnetic tape player, wherein a driving mechanism is provided to rotate a ratchet wheel mounted coaxially with the cam by one step when a solenoid is energized, and further rotate the wheel by one step when the solenoid is deenergized, and energization of the solenoid being controlled by the track-selecting switch and the rotary switch.

Other objects and advantages will become apparent from the following description of the exemplary embodiment of the invention illustrated in the drawings, in which:

DESCRIPTION OF THE PREFERRED EMBODIMENTS

Figure 1:
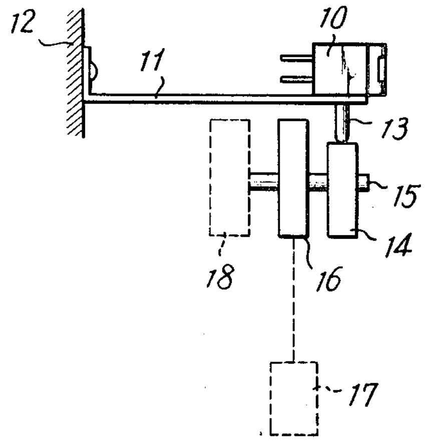
FIG. 1 is a representation schematically showing a magnetic head shifting means in track-selecting apparatus according to the invention.

FIG. 1 shows a track shift mechanism for track-selecting apparatus, according to the present invention, which is applied to a magnetic tape player. A magnetic head 10, as will be fully described later, is adapted to be moved to a plurality of different predetermined fixed points across the width of a magnetic tape (not shown) with respect thereto. The magnetic head 10 is firmly secured to a L-shaped support plate or a leaf spring 11 of which one end portion is fixed to a stable member 12 in the tape player. A downwardly extending pin 13 is mounted on the leaf spring 11 on the other side thereof. The rounded bottom end of the pin 13 is arranged to ride on a rotary cam 14 on a shaft 15. The leaf spring 11 is given the downward elastic force to maintain the pin 13 and the cam 14 in operative relation. A ratchet wheel 16 is rigidly mounted on the rotatably provided shaft 15 which is rotated when the ratchet wheel 16 is rotated by a driving mechanism 17 shown by dotted line, the detail of which will be described later. As the shaft 15 is rotated, the cam 14 is caused to be rotated to swing the leaf spring 11 through the pin 13 thus moving the magnetic head 10. A control device 18, as will be described later, shown by dotted line is coupled to the shaft 15 and adapted to block rotation thereof.

Figure 2:
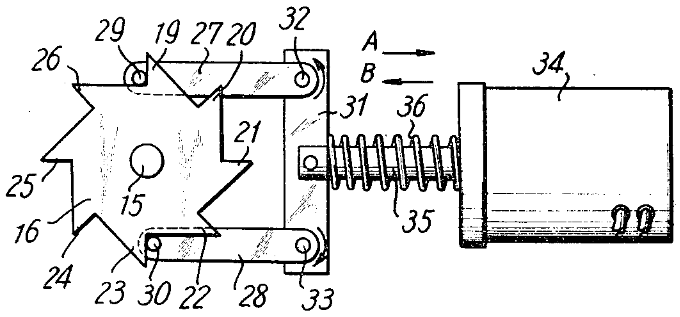
FIG. 2 is a representation showing a driving mechanism for the cam illustrated in FIG. 1.

Next, the driving mechanism 17 shown in FIG. 1 will be fully explained in conjunction with FIG. 2 in which similar numerals are used to illustrate like parts in FIG. 1. The ratchet wheel 16 includes eight gear teeth 19 to 26. Reciprocating levers 27, 28 are provided in relation to the ratchet wheel 16 and pins 29, 30 mounted on the lever 27, 28 mesh with the two teeth. The reciprocating levers 27, 28 are pivotally mounted on a lever 31 by shafts 32, 33 in turn provided on end portions of the lever 31 and urged by a spring (not shown) in the direction of the arrow. The lever 31 is fixed to a plunger 35 of a solenoid 34. Energization of the solenoid 34 allows the plunger 35 to be attracted in the direction of the arrow A against the bias of a compressive spring 36 and to be moved accordingly. With movement of the plunger 35, the reciprocating levers 27, 28 are caused to be moved and the pin 29 which is on the lever 27 engages the tooth 19 to rotate the ratchet wheel 16 by one tooth in the clockwise direction. At this time, the pin 30 on the reciprocating lever 28 is brought to such the state in which it is engaged by the tooth 21 since the pin 30 is caused to pass over the teeth 21, 22 by rotation of the ratchet wheel 16 and movement of the reciprocating lever 28. When the solenoid 34 is not supplied with the energy, the plunger 35 and the reciprocating lever 27, 28 are movably restored by the bias of the compressive spring 36 in the direction of the arrow B to thus allow the pin 30 on the reciprocating lever 28 to depress the tooth 21 to rotate the ratchet wheel 16 in the clockwise direction by one tooth. Assuming that the plunger 35 is fully returned to its original position, the pin 29 engages the tooth 25 of the ratchet wheel 16. That is, the ratchet wheel 16 is rotated in the clockwise direction by two teeth, namely 90° whenever the solenoid 34 is energized. The detail of the control device 18 in FIG. 1 will be apparent from the following description referring to FIG. 3 in which similar numerals are used to illustrate like part in FIGS. 1 and 2. The control device 18 includes two rotary switching means 37, 38 operated by the shaft 15. The rotary switching means 37 has insulation rotary disk 39 tightly mounted on the shaft 15 with the ratchet wheel 16 (FIGS. 1 and 2) which is operated step-by-step by the solenoid 34. In the present instance, the rotary disk 39 has four of such conductive pieces 40 to 43 spaced 90° apart from one another. Provided on a fixed member (not shown) of insulation opposed to the disk 39 is a switch 44 which consists of a pair of contacts 44*a*, 44*b* electrically separated with each other, the contacts 44*a*, 44*b* being shorted by the conductive pieces 40 to 43 on the disk 39 rotatable with rotation of the shaft 15. The rotary switching means 38 is provided with a collector drum 45 which is disposed outwardly of an elongated cylindrical member 46 made of insulative material, for instance, plastic. The collector drum 45 has four windows 47 to 50 (49 does not appear in Figure) which are arranged in a longitudinal formation and circumferentially spaced 90° apart from one another on the drum. Insulation block 56 is spaced from the collector drum 45 and provided with five contacts or brushes 51 to 55 which are arranged in parallel to one another and end portions of which come in contact with the surface of the collector drum 45. These contacts 51 to 54 are respectively governed by the windows 47 to 50 when the collector drum 45 makes one rotation so that they are cut off from electrical connection with the collector drum 45 whereas the common contact 55 may be always connected with the collector drum 45 electrically. As shown, the contacts 51 to 54 are respectively connected through track-selecting switches 57 to 60 with the switch contact 44*b* of the rotary switch means 37. The track-selecting switches 57 to 60 are conventional "alternative switches" and are so arranged that closing one switch will automatically open the others. The track-selecting switches 57 to 60 are provided to correspond to the first through fourth tracks on the magnetic tape and for designating the track to be played. The switch contact 44*a* of the rotary switch means 37 is connected with a plus terminal of an electrical source 61 and the solenoid 34 is connected between the minus terminal of the source 61 and the common contact 55.

Figure 3:
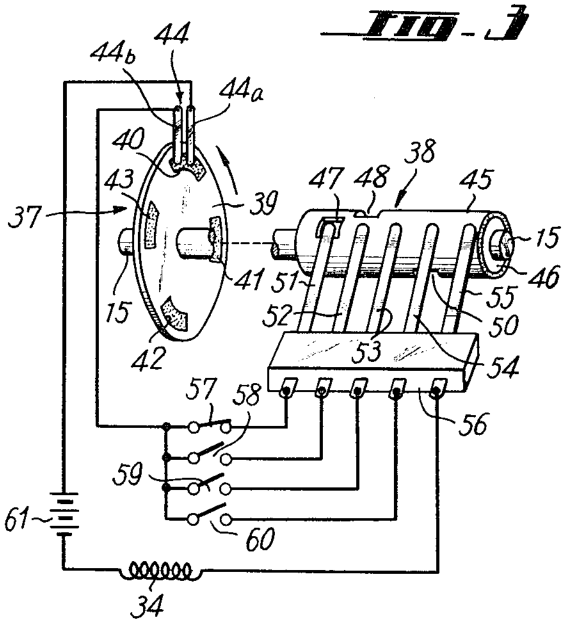
FIG. 3 is a schematic circuit diagram for controlling rotation of the cam in FIG. 1 and operation of the solenoid in FIG. 2.

FIG. 3 shows such condition that the track-selecting switch 57 has been closed to select the first track on the magnetic tape, wherein the switch 44 of the rotary switch means 37 is closed by the conductive piece 40 and the contact 51 of the rotary switch means 38 is governed by the window 47 and electrically disconnected with the collector drum 45. At this moment, the magnetic head 10 (FIG. 1) is brought to a position corresponding to the first track on the magnetic tape.

Assuming that the fourth track is desired to be played in place of the first track, a track-selecting switch 60 corresponding to the fourth track is operated to close switch 60 thereby opening the track-selecting switch 57. In response to closing the track-selecting switch 60, the solenoid 34 is energized by the source 61 through the switch contact 44*a*, the conductive piece 40, the switch contact 44*b*, the track-selecting switch 60, the contact 54, the collector drum 45, and the common contact 55. In response to energization of the solenoid 34, the ratchet wheel 16 (FIG. 2), as previously explained, is rotated ahead one step at the same time the rotary disk 39, the collector drum 45 are rotated. With rotation of the rotary disk 39, the conductive piece 40 is away from a position where it shorts the switch contacts 44*a*, 44*b* whereby the switch 44 is opened to deenergize the solenoid 34. Deenergization of the solenoid 34 causes the ratchet wheel 16 (FIG. 2), as previously mentioned, to be further rotated by one step, and then the rotary disk 39, the collector drum 45 are rotated. Due to the mode of operation as aforementioned, the shaft 15 is caused to be rotated by 90° from the position shown in FIG. 3, and the magnetic head 10 (FIG. 1) is moved by the cam 14 (FIG. 1) rotatable with rotation of the shaft 15 toward a position corresponding to the second track on the magnetic tape. On the other hand, the switch 44 is closed by the conductive piece 41 so that the solenoid 34 is energized to rotate the shaft 15 further so that the second track is not played. Since the rotary disk 39 is rotated as the shaft 15 is rotated, the switch 44 is opened to deenergize the solenoid 34 thereby rotating the shaft 15. In accordance with the aforementioned operation, the shaft 15 is rotated from the position shown in FIG. 3 by 180° whereby the magnetic head 10 (FIG. 1) is moved to a position corresponding to the third track on the magnetic tape. However, the switch 44 is closed by the conductive piece 42 to energize the solenoid 34 thus rotating the shaft 15 so as not to play the third track. With rotation of the shaft 15, the rotary disk 39 is rotated to open the switch 44 and to deenergize the solenoid 34 thus rotating the shaft 15. By the abovementioned operation, the shaft 15 is rotated from the position shown in FIG. 3 by 270° and the magnetic head 10 (FIG. 1) is moved to a position corresponding to the fourth track on the magnetic tape. At this time, the contact 54 corresponds to the window 50 and is electrically disconnected with the collector drum 45 so that the solenoid 34 is not energized even though the switch 44 is closed by the conductive piece 43. Accordingly, the magnetic head 10 (FIG. 1) is disposed to a position suitable for the fourth track on the magnetic tape and the fourth track which is designated by the track-selecting switch 60 is played. It will be readily understood from the foregoing description that the designated track is automatically selected and played by operating either one of the track-selecting switches 57 to 60 corresponding to the track desired to be played.

Figure 4:
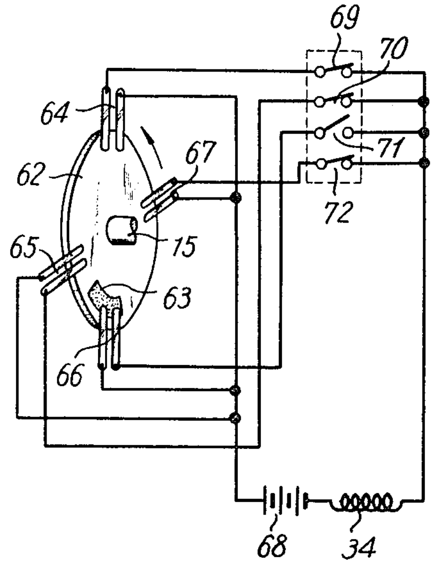
FIG. 4 is another schematic circuit diagram different from FIG. 3, for controlling rotation of the cam in FIG. 1 and operation of the solenoid in FIG. 2.

FIG. 4 shows a further embodiment of the control device different from that in FIG. 3, in which similar numerals are used to illustrate like parts in FIGS. 1 and 3.

Tightly mounted on the shaft 15 is an insulation rotary disk 62 the surface of which a conductive piece 63 is provided on. Switches 64 to 67 each consisting of a pair of contacts are mounted on a fixed member (not shown) of insulation, which is provided corresponding to the rotary disk 62. The switches 64 to 67 are spaced 90° apart from one another and successively closed by the conductive piece 63 due to rotation of the rotary disk 62 as the shaft 15 is rotated. The contacts on one hand with respect to switches 64 to 67 are connected to the plus terminal of an electrical source 68 and the other contacts are respectively connected in series with four track-selecting switches 69 to 72 provided corresponding to the first to the fourth tracks on the magnetic tape. The track-selecting switches 69 to 72, which are conventional "alternative switches," are provided for designating the track to be played on the magnetic tape and they are so adapted that when one switch is opened the others are automatically closed. The solenoid 34 is electrically connected between the track selecting switches 69 to 72 and the minus terminal of the source 68.

In FIG. 4, the track-selecting switch 71 is opened and the third track on the magnetic tape is designated and played. Now, in order to designate the first track in place of the third track, the track-selecting switch 69 is manually operated to thus open the same and automatically close the track-selecting switch 71. Simultaneously with closing of the track-selecting switch 71, the solenoid 34 is energized from the source 68 through the switch 66, the track-selecting switch 71 which have been closed by the conductive piece 63. In response to energization of the cam 16 (Fig. 1) is moved solenoid 34, the rotary disk 62 with the shaft 15 are rotated in the direction of the arrow. Since the conductive piece 63 is away from the switch 66 upon rotation of the rotary disk 62, the switch 66 is opened and the solenoid is deenergized. In response to deenergization of the solenoid 34, the rotary disk 62 with the shaft 15 are further rotated and the switch 67 is closed by the conductive piece 63. Due to the above-described operation, the shaft 15 is rotated by 90° and the magnetic head 10 (FIG. 1) which has been controlled by the cam 16 (FIG. 1) is moved to a position suitable for the fourth track on the magnetic tape, but the magnetic head 10 is caused to be away from such the position since the solenoid 34 energized again from the source 68 through the switch 67, the track selecting switch 72. The rotary disk 62 is rotated with rotation of the shaft 15 and the conductive piece 66 is away from the switch 67 thus to open the switch 67 thereby deenergizing the solenoid 34. In response to deenergization of the solenoid 34, the rotary disk 62 with the shaft 15 is rotated to a position where the conductive piece 63 closes the switch 64. According to the aforementioned operation, the shaft 15 is rotated by 180° from the position shown in FIG. 4 and the magnetic head 10 (FIG. 1) is moved to a position suitable for the first track on the magnetic tape. At this moment, the switch 64 has been closed, however, the solenoid 34 is not energized since the track-selecting switch 69, as mentioned already, is previously operated and opened. Accordingly, by way of operation of the track-selecting switch 69, the magnetic head 10 (FIG. 1) is automatically moved to a position suitable for the designated first track thereby playing the latter. It is apparent from the foregoing description that the track is automatically selected and played by operating either one of the track-selecting switches 69 to 72 to designate the track to be played.

The invention and its attendant advantages will be understood from the foregoing description. It is to be understood that changes and variations may be made without departing from the spirit and scope of the invention as defined in the appended claims.

What is claimed is:

1. A track-selecting apparatus for a multitrack magnetic tape player having a track changing device for moving a magnetic head to move across the tape to switch over the tracks to be played, comprising: rotary cam means for controlling said magnetic head to play said tracks; drive means for shifting the cam means in steps to position the magnetic head to successive track positions, said drive means including a rachet wheel mounted on a common operating shaft with the cam means, reciprocating lever means for rotating said rachet wheel, and solenoid means having a plunger connected to said reciprocating lever means, said ratchet wheel being operated step-by-step in relation to operation of said solenoid means to intermittently and rotatably drive the cam means; rotary switch means rotatably operated in synchronism with the cam means; track selecting switches corresponding to individual tracks on said tape to designate the tracks to be played; a control circuit for controlling operation of said solenoid means, said control circuit comprising, in series connection, said solenoid means, an electrical source for supplying energy to said solenoid means, said rotary switch means, and said tracking-selecting switches, said control circuit acting to start alternately energizing and deenergizing said solenoid, thereby rotating said cam, when a track-selecting switch is operated, and to stop said alternating energizing the deenergizing with the solenoid in the deenergized condition, thereby stopping said cam means, when the magnetic head has moved to a position suitable for playing the selected track.

2. A track-selecting apparatus for a multitrack magnetic tape player in accordance with claim 1, wherein said ratchet wheel is provided with a number of teeth equal to twice the number of the tracks on the tape, said reciprocating lever means comprising two reciprocating levers each having a pin engageable with different teeth of the ratchet wheel, each reciprocating lever being adapted to angularly rotate the ratchet wheel by one tooth thereof when said plunger is retracted.

3. A track-selecting apparatus for a multitrack magnetic tape player in accordance with claim 2, wherein said rotary switch means including a first rotary switch having an insulation rotary disk mounted on the common operating shaft with the cam means, a plurality of conductive pieces equally spaced on the disk and corresponding to the number of the tracks on the tape, and a pair of switch contacts electrically separated and operatively controlled by the conductive pieces with rotation of the disk, and a second rotary switch consisting of a collector drum mounted coaxially with the common operating shaft, insulation portions equally and circumferentially spaced longitudinally of the collector drum and corresponding to the number of tracks, a plurality of electrical contacts in electrical contact with the collector drum and arranged to be electrically disconnected from said collector drum by a respective one of said insulation portions, said electrical contacts corresponding to the number of the tracks, said electrical contacts being individually connected to each track-selecting switch and the pair of contacts of said first rotary switch being commonly connected to the track-slecting switch.

4. A track-selecting apparatus for a multitrack magnetic tape player in accordance with claim 3, wherein said track-selecting switches are so arranged that the one of them which is operated for designating the track to be played is maintained in closed condition whereas the remainder are in open condition.

5. A track-selecting apparatus for a multitrack magnetic tape player in accordance with claim 2, wherein said rotary switch means consists of an insulation rotary disk mounted on the common operating shaft with the cam means, a conductive piece provided on the rotary disk, and switches including a pair of electrically separated contacts equally spaced with respect to the rotary disk and corresponding to the number of the tracks, said switches being successively closed by the conductive piece upon rotation of the rotary disk, each of the switches being individually connected corresponding to each of the track selecting switch, 6. A track-selecting apparatus for a multitrack magnetic tape player in accordance with claim 5, wherein said track-selecting switches are so arranged that the one on them which is operated for designating the track to be played is maintained in open condition whereas the remainder are in closed condition.

* * * * *